(12) United States Patent
Lawrence et al.

(10) Patent No.: US 6,799,138 B2
(45) Date of Patent: Sep. 28, 2004

(54) BREAKLOCK DETECTION SYSTEM AND METHOD

(75) Inventors: Nikki J. Lawrence, Tucson, AZ (US); Thomas K. Lo, Oro Valley, AZ (US); Joshua A. Whorf, Tucson, AZ (US); Mark S. Moellenhoff, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/135,158

(22) Filed: Apr. 30, 2002

(65) Prior Publication Data

US 2003/0204360 A1 Oct. 30, 2003

(51) Int. Cl.7 .............................. G01P 15/00; F41G 7/00
(52) U.S. Cl. ...................... 702/141; 702/142; 702/150; 244/3.1
(58) Field of Search ................................ 702/176, 127, 702/141, 142, 143, 144, 149, 150–151; 244/3.1, 3.13, 3.14, 3.16; 342/54, 6.8, 104, 106, 387

(56) References Cited

U.S. PATENT DOCUMENTS 4,224,507 A * 9/1980 Gendreu ..................... 235/412
5,044,195 A * 9/1991 James et al. ................ 73/117.3
5,171,933 A * 12/1992 Eldering ..................... 89/41.06
6,265,704 B1 * 7/2001 Livingston ................ 250/203.2

FOREIGN PATENT DOCUMENTS

| FR | 2 737 578 A | 2/1997 | ........... G01S/13/58 |
| JP | 09 236400 A | 9/1997 | ........... F24B/15/01 |

* cited by examiner

Primary Examiner—Bryan Bui
(74) Attorney, Agent, or Firm—Renner, Otto, Boisselle & Sklar LLP

(57) ABSTRACT

A tracking system controls an aimed device (32) to keep it aimed at a target (34). A control system (10) determines when the tracker has lost its lock on the target (34) by comparing the target's instantaneous acceleration with its median acceleration. When the difference exceeds a predetermined threshold, the system searches backwards through a chronological buffer until it finds position data which antedate the receipt of inaccurate position data from the tracker. A second-order filter such as a Kalman filter is used to provide estimated target states. The difference between a time updated output from the second-order filter (16) and the present measured state from the tracking device is low pass filtered to provide a measurement of the instantaneous acceleration of the target. The buffer (20) stores position, velocity, and median acceleration values covering a span of time at least about twice as long as the time required to determine that a breaklock has occurred.

18 Claims, 3 Drawing Sheets

| Frame Number | X state | X_dot state | Filtered residual | Median residual |
|---|---|---|---|---|
| 1 | X(1) | X_dot(1) | Residual (1) | Median resid (1) |
| . | . | . | | |
| N | X(N) | X_dot(N) | Residual(N) | Median residual (N) |

Contents of Buffer 24

FIG. 2

BREAKLOCK DETECTION SYSTEM AND METHOD

FIELD OF THE INVENTION

The present invention relates to trackers that track targets and to an improved system for detecting when a tracker is no longer locked on the target.

BACKGROUND OF THE INVENTION

A target tracker is used in many military systems such as for guiding anti-aircraft missiles, so-called smart bombs, torpedoes, anti-tank ordinance, and the like. In all these systems the tracker obtains target location information at timed intervals and "locks on" the target. The designers and operators of potential targets attempt to break the lock on the target in a number of ways. Missiles may deploy dummy warheads or other decoys to confuse the tracker. A tank may avoid a heat seeking tracker by driving through a field of fires. Any of these techniques, among others, can cause a tracker to breaklock and track some object other than the target. Target trackers attempt to detect these decoys and evasive maneuvers, and upon detection revert to a different method of tracking. A difficulty in this process lies in determining or even estimating where the target may have gone in the time between when the tracker started tracking the wrong target and the time when the breaklock was detected. This time period is termed the latency period.

Prior attempts at breaklock detection are highly algorithm dependent. The general method is to measure the difference between some measured target attribute and the corresponding predicted value at each measurement interval. The predicted value is based on prior measurements. For example, a correlation tracker may use as its attribute the correlation coefficient between the reference image (from the past) and the current image. The correlation coefficient is compared to a threshold to determine the accuracy of the measurement. A segmentation-based tracker may use prior target intensities to pick out objects of similar intensity in the present image and deduce the accuracy of tracking on the basis of the consistency of segmentation. While the individual breaklock detection techniques differ, the common feature is that all decisions are made independently at each observation time. If and when a breaklock is detected, the prior art simply coasts with the estimated target rate at the time of breaklock detection and hopes that the estimated rate is not too badly corrupted.

As noted, current methods of breaklock detection are based on single measurements. Because of noise associated with measurements, these breaklock detection methods are generally effective only when the disturbance is catastrophic. Current methods of breaklock detection fail to detect breaklocks that occurs gradually. The failure to detect gradual breaklocks occurs because the disturbance between adjacent observation times is small compared to the noise in the measurement.

Another problem associated with current breaklock detection methods has to do with the corruption of the target state estimator. Because breaklock detection always occurs after the fact i.e., after a latency period, there is always a corruption of the estimated target state due to updating with erroneous measurements. When breaklock is not detected promptly, there is considerable corruption of the target state estimates. The incurred corruption leads to incorrect posting and diminishes the likelihood of reacquisition of the target.

In effect current systems base their prediction of where the target is based on where the target was at the time the system discovered it was no longer tracking the target. As explained below, the present invention bases its prediction of where the target is on where the target was at the last time its position was accurately known.

SUMMARY OF THE INVENTION

In one aspect the present invention provides a system that detects a breaklock condition by detecting anomalous acceleration of the putative target over multiple observation intervals. In another aspect, the present invention provides a projection of the location of a target based on uncorrupted target information acquired and stored before a breaklock is detected.

The system acquires target information from any existing or future device that provides a stream of target data representing a target position at timed intervals or "frames". The target data is fed through a second order filter such as a Kalman filter, to reduce random noise and so produce estimated true target position and velocity data. The filtered position and velocity data are used to generate projected target data for the next frame.

Projected target data is then compared to the acquired target data for that frame, and the difference between the two, called a residual, is an initial measure of target acceleration. The residual is passed through a low pass filter to produce a filtered residual which is essentially an average of the residuals over a selected time period, generally a fairly short time period. The filtered residual is a good approximation of the instantaneous acceleration of the target and is sent to one input of an adder to generate a signal that determines whether a breaklock has occurred.

The adder receives as its other input a signal from a buffer that determines the median filtered residual over a selected number, N, of immediately preceding frames. When N is relatively large, the median filtered residual is a good approximation of the target's long term acceleration. This median is sent to the adder where the difference between the median residual is compared to the current value of the mean residual. By selecting the number, N, of frames over which the median is calculated and the time constant of the low pass filter, the system generates a difference between a fairly stable number (the median) and a short term average acceleration that approximates the instantaneous acceleration of the target. If the difference exceeds a set threshold, a breaklock has been detected. The threshold for triggering a breaklock determination may be made by selecting the maximum acceleration of which the target is capable divided by the gain of the low pass filter.

Once a breaklock has been detected, several things occur in the system. First, target positions determined by the tracker are no longer used to update the target states in the buffer. This is done by inhibiting the output from the second order filter to the buffer. Next the system looks in the buffer for the most recent uncorrupted data. It does this by looking backward in the buffer for first filtered residual that is on the opposite side of the median as the filtered residual of the frame where the breaklock was detected. Only the positions and velocities stored in the buffer from before this first opposite-side-of-the-median frame are used to project the target location.

Thus, the present invention detects a breaklock by comparing the long term average target acceleration to the instantaneous target acceleration. When a breaklock is detected, target position is re-estimated based on target position and velocity data accumulated prior to when the break lock occurred.

These and other features of the present invention will be clear to those of ordinary skill in the art from reading the following specification in conjunction with the accompanying drawing.

BRIEF DESCRIPTION OF THE DRAWINGS

FIG. 2 is a schematic illustration of a buffer used to store data for use in practicing the present invention.

DESCRIPTION OF THE PREFERRED EMBODIMENTS

Figure 1:
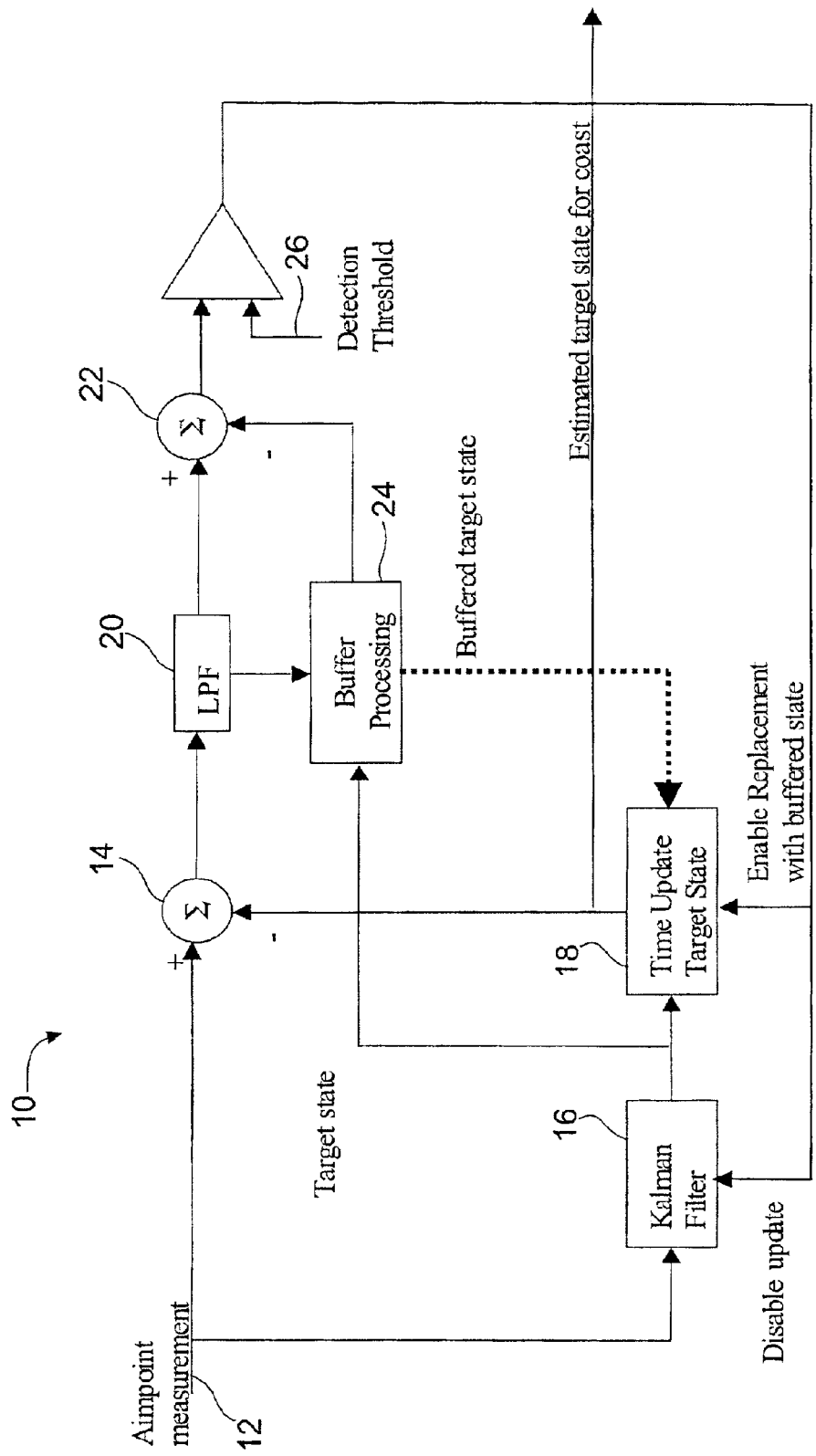
FIG. 1 is a block diagram of a system constructed in accordance with the present invention.

The method of practicing the present invention and a system 10 for carrying it out are illustrated in FIG. 1. The method takes advantage of the facts that while targets do accelerate, their accelerations are limited in magnitude and do not change their acceleration rapidly and that a breaklock can be detected by comparing the target's instantaneous acceleration to its long-term acceleration.

It is contemplated that the system 10 illustrated in FIG. 1 can be executed by a digital processor. It may be embodied in firmware as a custom chip, either alone or as part of a larger targeting system. Alternatively, the system may be embodied in software to be executed on a general purpose computer.

The method and system 10 are applicable to virtually any tracking system that provides target position information (also called aim point measurements) at arbitrarily spaced time intervals. The method and system 10 may be used with any target position data generator 12 including infrared systems, sonar systems, radar systems, optical systems, laser based systems, and any other known or to be developed system which can provide target position information (aim point measurements) at regular time intervals. While the method and system 10 of the present invention is contemplated for use with target position information that is supplied at regular intervals, it can be adapted for use with position information supplied at irregular intervals, providing the length of the interval in each case is known. The target position information for each interval is received at input 12 and stored in a "frame" associated with that interval.

The target position information is sent on two paths, one going directly to an adder 14, and the other going to a filter 16. Target position information often includes noise which may be of the same order of magnitude as or greater than the movement of the target from one frame to the next. In order to eliminate this noise the signal fed to the filter 16 is passed through a second order filter, such as a Kalman filter or an alpha-beta filter. The output of the second order filter 16 is an estimate of the target's true present position and velocity. This data is passed to a time update/target state estimator 18, where an estimate of where the target is expected to be at the next frame is generated. The time update/target state estimator preferably makes a linear projection based on the output of the second order filter 16, but other projection techniques may also be used.

The predicted value from the time update/target state estimator 18 is compared with the actual value measured for that particular frame in the first adder 14. It is well understood by those skilled in the art that the output of a future predicted position based on the updated output of a second order filter will lag the actual target position for an accelerating target. Accordingly, the output of the first adder 14, called a residual, is a good approximation of the acceleration of the target. The residuals are noisy. When the target is not accelerating the mean residual is zero, but the mean residual is nonzero whenever the target is accelerating. Because of the noise, it is not practical to use the residual directly to determine target acceleration.

Accordingly, the residuals which are the output of the first adder 14 are sent next through a low pass filter 20. This filter produces as its output the mean value of the residuals over a selected period of time. These mean values of the residuals are then fed to a second adder 22 and to a buffer 24. The buffer 24, explained more fully in detail below, accumulates frame information and also stores the mean residual associated with each frame over a selected number of frames. The buffer 24 also produces and stores the median value of all the mean values associated with each frame in the buffer. The difference between the median value of the residuals stored in the buffer 24 and the current mean value of the residual determines whether or not a breaklock has been detected.

This result is obtained by selecting the number of frames stored in the buffer 24 so that it is relatively large and selecting a relatively smaller number of frames that are included in each mean residual from the low pass filter (determined by the frequency cut off or time constant of the low pass filter). For example, when thirty (30) aim point measurements are received every second, the buffer 24 may store about twenty (20) frames and the low pass filter 20 may effectively represent the average acceleration over 6.7 frames. When the buffer 24 and low pass filter 20 are selected in this way, the median residual value does not change rapidly in the face of a sudden acceleration of the target, but the mean residual does. The mean residual, being averaged over a relatively few frames, closely approximates the instantaneous acceleration of the target. When the difference between the mean and the median of the residuals exceeds a preset limit set at threshold input 26, a breaklock situation has been detected.

The buffer 24 stores information about the target state associated with each frame. The buffer structure is shown in FIG. 2. The buffer 24 may be considered as using one row for each frame. The buffer 24 receives target position information and target velocity information generated by the second order filter, and stores this information in two columns, X STATE and X DOT STATE. The target position and velocity information X and XDOT, are vectors, representing position and acceleration in three-dimensional space. As noted above, the buffer 24 also stores the mean residual (received from the low pass filter 20) associated with each frame, calculates the median residual for all the residuals in the buffer at the time each mean residual is entered.

The buffer 24 is essentially a first in and first out stack containing information about N frames. The minimum value of N is at least two times the number of frames which pass between the time when the target break actually occurs and the time it is detected. This number is experimentally determined and is governed by a number of factors including the nature of the target itself. For example, a tank has a smaller range of accelerations than a fighter jet. At the same time, the sampling rate for collecting target position information may be greater for one kind of target than another. The buffer 24 is suitably large so that when a breaklock is detected, the buffer, as described below, can discard data generated since the actual loss of target by the target position data generator 12 and still have a substantial number of frames from which to project the true course of the target. Accordingly, the size of the buffer 24 (as compared to the time constant of the low pass filter 20) is selected to provide a history of target position, velocity and acceleration that is at least twice as long as the latency period.

The position data in the buffer 24 are updated with each new frame. This is done by multiplying the particular velocity approximation associated with a particular frame by the length of the time interval, and adding the result to the position data for that frame. As a result of this updating, each frame's position data represents the location where the target would be if its velocity had not changed since its velocity was first approximated and stored in that particular frame in the buffer.

When a breaklock has been detected, the system 10 searches the buffer 24 for the most recent frame with non-suspect data. The system updates the most recent non-suspect frame and all frames prior to it. This updated last known good position estimate sent to the time update generator to provide a linear projection of target position based on the last known good position data. The system 10 remains coasting in this mode using repeated time updates based on the last position for which good data exists until the target is reacquired.

Because a number of frames will have been processed and stored in the buffer 24 before a breaklock is detected, the buffer will contain frames with corrupted or invalid data. Further updating of the buffer with information from the second order filter 16 is therefore halted as soon as a breaklock is detected. To find the last good position data the buffer 24 scans backward through its various frames of data until it finds the first frame in which the difference between the filtered residual and the median residual changes sign. This very closely approximates the moment when breaklock actually occurred. All data from that point forward are flushed from the buffer 24. Meanwhile the data from the time update generator is also fed to the first adder 14 and a new residual is created based on the difference between the last good known position data as updated and the newest aim point measurement received from the target position data generator 12. The newly created residuals are filtered by the low pass filter 20, stored in the buffer 24, and compared to the median residual from the buffer. The system continues operating in this manner until the difference between the mean residual and the median residual falls below the threshold, an indication that the target has be reacquired.

The threshold for determining that a breaklock has occurred is set by determining the maximum acceleration for the particular target under normal circumstances and dividing it by the gain of the low pass filter. The maximum acceleration of the target is an experimentally determined value dependent upon the nature of the target.

Figure 3:
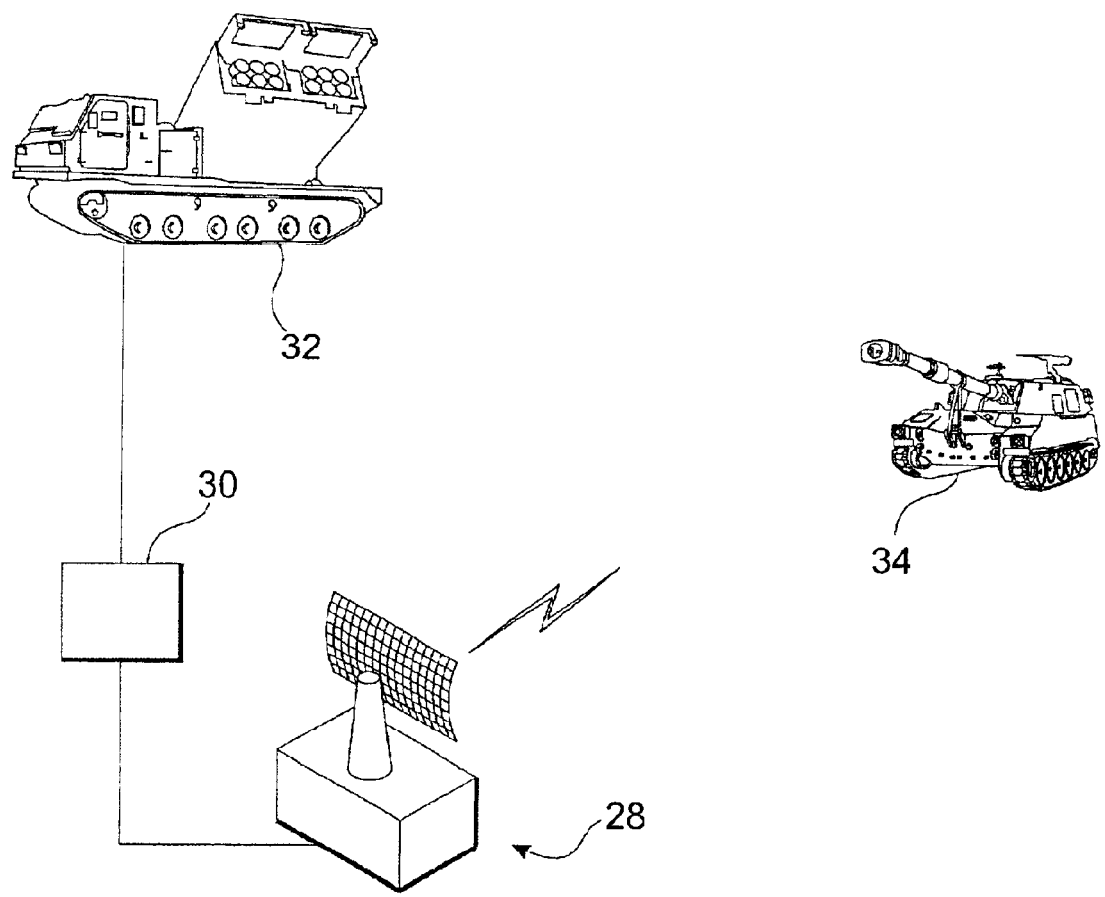
FIG. 3 is a schematic illustration of a target and a tracker controlling a device aimed at the target utilizing the present invention.

FIG. 3 schematically illustrates a system 10 utilizing the present invention. A tracking device 28 sends position information about the target to a controller 30. The controller 30 in turn operates an aimed device such as the artillery piece 32 aimed at the target 34. Note that the tracking device 28 may be any known tracking device, either active or passive, utilizing any part of the electromagnetic spectrum, or other types of information, for example sound waves in air or water, or even seismic waves. The aimed device is shown as an artillery piece 32, but it could be any weapon or simply an observation device such as a telescope or listening device. In normal operation the tracking device 28 provides target position information that the controller 30 uses to aim the aimed device 32. If the tracker loses its "lock" on the target 34, the system 10 detects the break lock, uses the buffer 24 to predict target position as described above and returns to normal operation only when the system indicates the target acceleration as measured by the tracking device has dropped below the threshold.

The logic 10 (FIG. 1) of the present invention may be embodied in software or code executed by general purpose hardware as an alternative the logic (FIG. 1) may also be embodied in dedicated hardware or a combination of software and general purpose hardware and dedicated hardware. If embodied in dedicated hardware, the logic (FIG. 1) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 1 shows the architecture, functionality, and operation of an implementation of the logic. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s).

Although the block diagram of FIG. 1 shows a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the block diagram and/or flow chart of FIG. 1 is relatively self-explanatory and is understood by those with ordinary skill in the art to the extent that software and/or hardware can be created by one with ordinary skill in the art to carry out the various logical functions as described herein.

Also, where the logic (FIG. 1) comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the logic (FIG. 1) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

What is claimed is:

1. A method of tracking a target comprising:
gathering target position information at timed intervals,
   approximating the target's median acceleration over first period of time, approximating the targets instantaneous acceleration over a second period of time shorter than the first period of time,
   comparing the approximate median acceleration of the target to the approximate instantaneous acceleration of the target, and
   determining whether the target position information is correct based on the comparison.

2. A method of tracking a target comprising:
gathering target position information at timed intervals,
   approximating the target's median acceleration over first period of time, approximating the target's instantaneous acceleration over a second period of time shorter than the first period of time, and
   comparing the approximate median acceleration of the target to the approximate instantaneous acceleration of the target to determine whether the target position information is correct, and
   further including the step of using position and velocity data for each timed interval generated by a second-order filter from a projected target location for each timed interval.

3. The method of claim 2 wherein the second-order filter is selected from the group comprising a Kalman filter and an $\alpha$-$\beta$ filter.

4. The method of claim 2 further including the step of forming a residual by comparing the projected target position during a timed interval with the gathered target position information for that same interval.

5. The method of claim 4 wherein the step of approximating the target's instantaneous acceleration includes passing the residual values for successive timed intervals through a low pass filter to generate a filtered residual.

6. The method of claim further including the step of providing a buffer to store the second-order filter generated position and velocity data and the filtered residuals for a selected number of timed intervals.

7. The method of claim 6 wherein the step of approximating the target's median acceleration includes storing the filtered residual in the buffer as each new filtered residual is generated, calculating the median of all the residuals then in the buffer, and storing that median in association with the target position, velocity, and filtered residual values most recently stored in the buffer.

8. The method of claim 2 further including the step of providing a buffer to store the second-order filter generated position and velocity data for a selected number of timed intervals.

9. A method of tracking a target comprising
   receiving aimpoint measurements of the targets position at timed intervals from a measuring device,
   using the aim point measurements to control a device aimed at the target,
   storing information concerning the target's position as target position data associated with the timed interval at which the measurement was made,
   determining target velocity data from the target position,
   determining an approximation of target instantaneous acceleration from the target position data,
   the step of storing information concerning the target's position further including the step of storing information concerning the velocity approximation and the step of storing information concerning the instantaneous acceleration approximation in association with each timed interval,
   determining the median of all instantaneous acceleration approximations and storing information concerning the median in association with the most recent timed interval included in the determination,
   detecting anomalous target position data by comparing the instantaneous acceleration for a timed interval to the median acceleration associated with that timed interval,
   determining when the anomalous target position began,
   and controlling the device aimed at the target using the position and velocity data associated with the timed interval immediately preceding the beginning of the anomalous acceleration.

10. The method of claim 9 further including the step of passing the aimpoint measurements through a second order filter prior to performing the storing step.

11. The method of claim 10 wherein the step of storing includes storing the information in a buffer of selected size and repeatedly deleting the oldest information in the buffer to make room in the buffer for the newest information.

12. The method of claim 11 wherein the step of determining an approximation of the target's instantaneous acceleration includes generating a residual for successive timed intervals by projecting based on the output of the second order filter what the aimpoint measurement for the next timed interval should be and subtracting the predicted value from the aimpoint measurement of said next timed interval.

13. The method of claim 12 further including the step of passing the residuals through a low pass filter.

14. The method of claim 13 wherein the step of storing includes storing information concerning each residual in the buffer in association with the timed interval during which it was generated.

15. The method of claim 14 wherein the second order filter is selected from the group comprising a Kalman filter and an $\alpha$-$\beta$(alpha-beta) filter.

16. The method of claim 14 wherein the step of determining when the anomalous target position data began includes reviewing the contents of the buffer for the first timed interval, prior to the most recent timed interval, in which the difference between the information concerning the approximate instantaneous acceleration and the information concerning the median of the approximate instantaneous accelerations stored in the buffer is different in sign from the difference between the information concerning the approximate instantaneous accelerations stored in the buffer associated with the most recent timed interval.

17. The method of claim 16 further including the step of using the data associated with the timed interval that is N timed intervals prior to the first timed interval, where N is zero or a positive integer.

18. The method of claim 9 wherein the step of storing includes storing the information in a buffer of selected size and repeatedly deleting the oldest information in the buffer to make room in the buffer for the newest information.

* * * * *